Nov. 14, 1944.  G. F. PEMBROKE  2,362,924
APPARATUS FOR TESTING OR MEASURING SIZES OR DIMENSIONS
Filed March 26, 1942  2 Sheets-Sheet 1

Inventor
George F. Pembroke
By
Watson, Cole, Grindle & Watson
Attys.

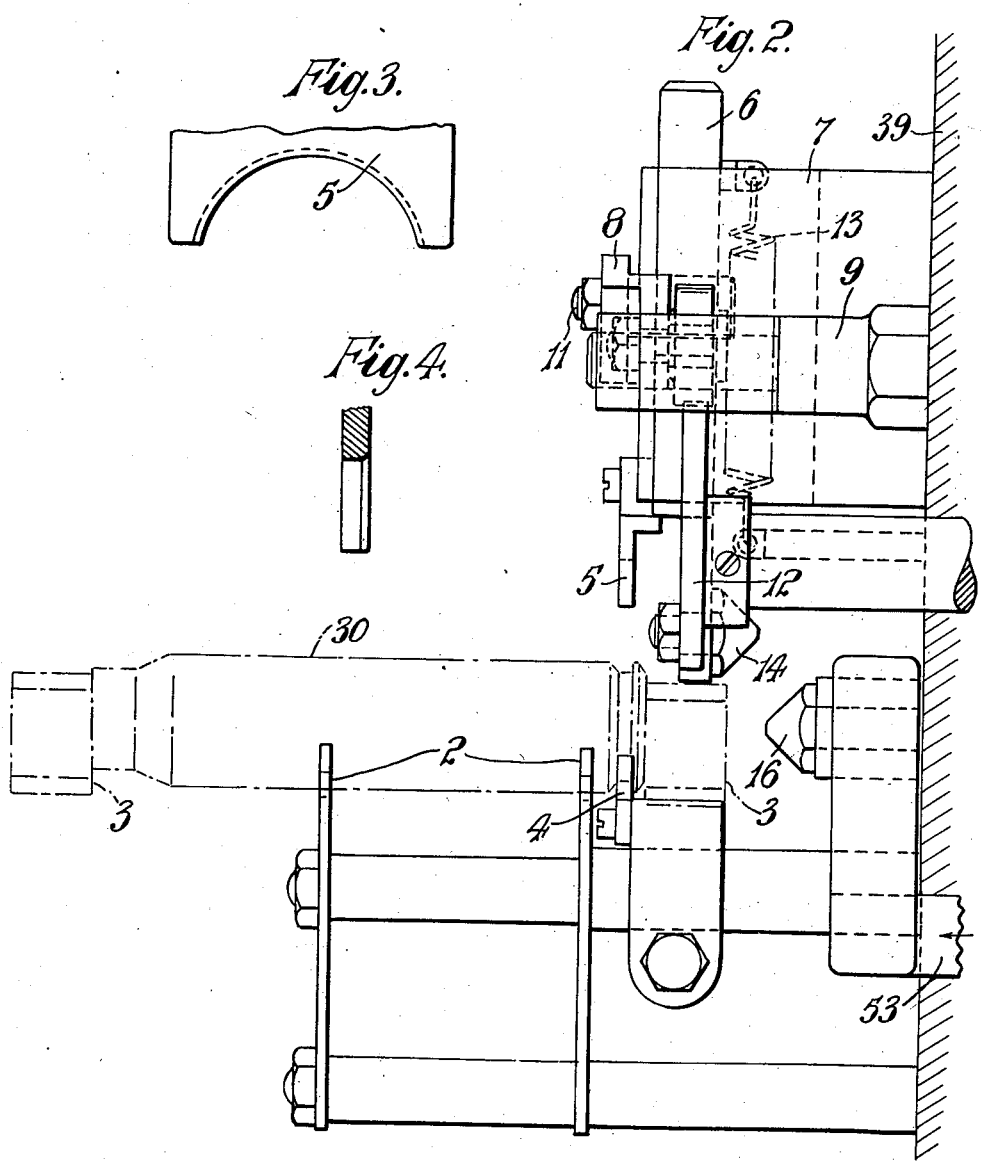

Patented Nov. 14, 1944

2,362,924

UNITED STATES PATENT OFFICE 2,362,924

APPARATUS FOR TESTING OR MEASURING SIZES OR DIMENSIONS

George Frederick Pembroke, Deptford, London, England, assignor to Molins Machine Company Limited, Deptford, London, England Application March 26, 1942, Serial No. 436,370
In Great Britain March 18, 1941

3 Claims. (Cl. 33—178)

This invention concerns improvements in or relating to apparatus for testing or measuring sizes or dimensions, hereinafter referred to as "measuring apparatus."

According to the invention there is provided measuring apparatus comprising in combination, a reciprocable feeler, a measurement transmitter reciprocable in a fixed path transverse to that of said feeler, an abutment carried by the feeler, and a further abutment carried by the transmitter, each of the abutments having a sloping portion, the abutments being caused to engage at their sloping surfaces which are so arranged that the position assumed by the feeler-abutment determines the extent to which the transmitter-abutment may move in its fixed path.

The engaging sloping portions may be parallel so as to constitute opposed wedges which are arranged to engage each other on movement of the transmitter towards the feeler when a measuring operation is effected, whereby the extent of engagement of the sloping portions along one another determines the extent of movement of the transmitter towards the feeler. Each of the abutments may be conically shaped, the angles between the engaging sloping portions of the abutments and the direction of movement of their respective members being complementary so as to constitute opposed parallel wedges.

One embodiment of the invention will now be described by way of example with reference to the accompanying drawings which show part of a machine for measuring an external diameter of a cartridge-case, which latter will be referred to hereinafter as "a case."

In the drawings:

Figure 2 is a side elevation of Figure 1.

Figure 3 is a front elevation of a fragment of a feeler.

Figure 4 is a section of Figure 3.

Figure 1:
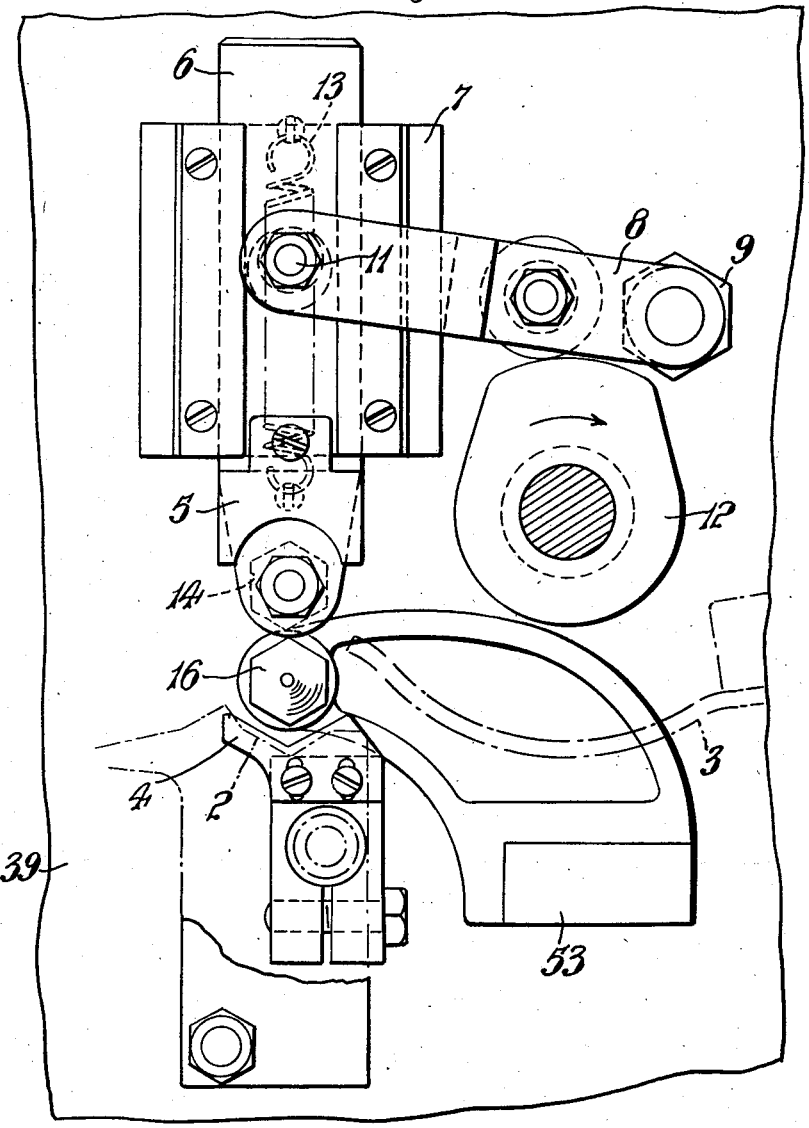
Figure 1 is a front elevation of the measuring apparatus.

For the purpose of the present description the cases shown are of the kind in which each case has a groove near the base thereof. It is the measurement of this groove which will be described below.

Cases 30 are fed in succession on to V shaped supports 2 which are located at the position at which the measurement of the groove of a case is to be effected. The mechanism for feeding the cases to the V shaped supports is preferably similar to that described in the co-pending British patent application No. 3437/41.

As the cases are moved towards and on to the V shaped supports, the bases of the cases are engaged by vertical guides 3, these guides being arranged to ensure that the case is in the correct position when it is resting on the V shaped supports.

When the case has been positioned on the V shaped supports the lower portion of the groove is located on the anvil 4 which is shaped to receive the lower portion of the periphery of the groove in said case. Above the anvil there is provided a feeler 5 fixed to a slidable element 6 which is vertically reciprocable in a guide 7. Movement of the feeler is effected by means of a lever 8 pivoted on a stud 9 fixed to the frame 39 and connected to the element 6 by a pin 11. A cam 12 raises the lever and the feeler 5 is pulled down on to the case by a spring 13. The lower or contacting edge of the feeler is shaped to conform with the shape of the upper peripheral portion of the groove, see Figures 3 and 4 which show the operative part of the feeler to a larger scale. The anvil 4 is of V shape but is chamfered in the same manner as the feeler 5. Also at the position which is near the lower end of the feeler there is secured an abutment 14 which is of conical shape. The purpose of this abutment will be described below.

Measurements effected by the feeler are transmitted therefrom to indicator-mechanism which is similar to that referred to in the specification accompanying United States patent application Serial No. 399,561. This indicator-mechanism includes a slidable bar 53 which supports a magnet, and also indicator-members. The sliding bar in the present instance comprises a transmitter through which measurements effected by the feeler are transmitted to the indicator mechanism. The end of the sliding bar which is nearest the feeler is provided with a further abutment 16 which is also of conical shape. The feeler and the sliding bar 53 are movable in paths which are normal to each other and, in the construction being described, the apex angle of each of the contacts is 90°, so that the angles between the sloping portions and the direction of movement of their respective members are complementary and the sloping portions constitute opposed parallel wedges. From the foregoing description it will be seen that the abutments each have sloping portions.

When a measuring operation is being effected, the sliding bar 53 is moved towards the feeler under the action of a spring as described in the co-pending United States application Serial No. 399,561 and the abutment 16 on the sliding bar engages with the abutment 14 on the feeler. The apparatus is so set initially that if the diameter at the bottom of the groove of the case is found to be within the desired limits, the abutments will engage each other to a predetermined extent. Should, however, the diameter at the bottom of the groove be greater or less than the desired diameter, the extent of engagement between the conical surfaces will be less or greater than that to which the abutments were originally set. Thus, the extent to which the abutments engage each other determines the extent of movement of the sliding bar and this in turn determines the operation of the indicator-mechanism.

If desired, the abutments could comprise wedge shaped members instead of conically shaped members as above described, but it is preferred to employ conical shaped members because with such members there is only line contact and it is therefore easier to provide a correct contact than if flat surfaces are employed. Further, by turning the conical members about their axes, different engaging surfaces may be provided, should the surfaces tend to wear during use.

What I claim as my invention and desire to secure by Letters Patent is:

1. Measuring apparatus, comprising in combination, a reciprocable feeler member, a measurement transmitter member reciprocable in a fixed path transverse to that of said feeler member, each of said members being formed with a sloping surface, the said sloping surfaces cooperatively engaging to limit reciprocation of the members toward each other, each of said sloping surfaces forming with the direction of reciprocation of one of said members an angle which is complementary to the corresponding angle formed by the other of said sloping surfaces, at least one of said surfaces being convexly curved in planes normal to such direction of reciprocation, means to position the feeler member in contact with a work piece, and means operable subsequently to the said positioning of the feeler member for yieldably urging said transmitter member toward said feeler member, whereby said surfaces are caused to engage with a line contact and thereby the position assumed by the feeler member determines the extent of movement of the transmitter member in its fixed path through the co-action of said surfaces.

2. Measuring apparatus, comprising in combination, a reciprocable feeler member, a measurement transmitter member reciprocable in a fixed path transverse to that of said feeler member, each of said members being formed with a conical surface of which the axis extends in the direction of reciprocation of one of said members, the said conical surfaces cooperatively engaging to limit reciprocation of the members toward each other, the apex angles of said conical surfaces being complementary, whereby said surfaces are caused to engage with a line contact, means to position the feeler member in contact with a work piece, and means operable subsequently to the position of the feeler member, yieldingly to urge the transmitter member towards the feeler member when so positioned whereby the extent of movement of one member may be limited by the other member through the co-action of said surfaces.

3. Measuring apparatus as claimed in claim 2 in which the apex angle of each of said conical surfaces is 90°.

GEORGE FREDERICK PEMBROKE.